United States Patent [19]
Bannai et al.

[11] Patent Number: 5,655,920
[45] Date of Patent: *Aug. 12, 1997

[54] CLOCK SPRING CONNECTOR

[75] Inventors: Hiroyuki Bannai, Furukawa; Hironori Kato, Sendai; Kunihiko Sasaki, Miyagi-ken, all of Japan

[73] Assignee: Alps Electric Co., Ltd., Tokyo, Japan

[*] Notice: The portion of the term of this patent subsequent to Jan. 11, 2011, has been disclaimed.

[21] Appl. No.: 589,974

[22] Filed: Jan. 23, 1996

Related U.S. Application Data

[62] Division of Ser. No. 267,073, Jun. 28, 1994, abandoned.

[30] Foreign Application Priority Data

Jun. 30, 1993 [JP] Japan ................................. 5-161892

[51] Int. Cl.⁶ ..................................................... H01R 35/04
[52] U.S. Cl. ................................................ 439/164; 439/15
[58] Field of Search ........................................ 439/164, 15

[56] References Cited

U.S. PATENT DOCUMENTS

| | | |
|---|---|---|
| 3,763,455 | 10/1973 | Confer et al. ..................... 339/3 S |
| 4,540,223 | 9/1985 | Schmerda et al. .................. 339/3 S |
| 4,925,122 | 5/1990 | Bannai ................................. 439/15 |
| 4,975,063 | 12/1990 | Ida et al. ............................. 439/15 |
| 5,256,075 | 10/1993 | Miyahara et al. ................... 439/164 |
| 5,277,604 | 1/1994 | Ida et al. ........................... 439/164 |
| 5,314,344 | 5/1994 | Ida et al. ........................... 439/164 |

*Primary Examiner*—Gary F. Paumen
*Attorney, Agent, or Firm*—Guy W. Shoup; Patrick T. Bever

[57] ABSTRACT

A clock spring connector having a high reliability of the connection and excellent workability of the assembly, said clock spring connector being capable of reducing noise. A flexible cable is wound on the outer cylindrical unit of a first housing and the inner cylindrical unit of a second housing so that the directions of the windings are opposite to each other, and a spacer disposed between the outer and inner cylindrical units rotates following the U-shaped turned-back portion of the flexible cable. An elastic tongue piece is disposed along the portion extending from the inner cylindrical unit, of the flexible cable and formed to be curved so that the tongue piece is located between the inner cylindrical unit and the spacer when no load is applied thereto.

2 Claims, 6 Drawing Sheets

CLOCK SPRING CONNECTOR

This application is a division of application Ser. No. 08/267,073, filed Jun. 28, 1994, now abandoned.

BACKGROUND OF THE INVENTION

1. Field of the Invention

The present invention relates to a clock spring connector which is incorporated in a steering device of an automobile and used as an electrical connecting means for an air bag or the like.

2. Description of Related Art

In a clock spring connector, a fixed member is connected through a belt-like flexible cable to a movable member so mounted as to be rotatable relative no this fixed member. The clock spring connector is employed as an electrical connecting member between a movable member and a fixed member, having a finite number of revolutions as in the case of a steering device of an automobile.

In this clock spring connector, the flexible cable occupies a high percentage of the total cost. Proposed in the specification of U.S. Pat. No. 4,540,223 is a clock spring connector constructed to reduce the costs by decreasing the length of a flexible cable needed.

FIG. 10 is a plan view showing a schematic construction of a clock spring connector disclosed in the aforementioned specification. As shown in the same Figure, a movable member 101 is mounted to a cylindrical fixed member 100 so as to be rotatable relative to the fixed member 100. The fixed member 100 is fixed to a steering column of an automobile and the movable member 101 is fixed to a steering wheel. A ring-like incorporating space 102 is defined between the fixed member 100 and the movable member 101, and a flexible cable 103 is incorporated in the incorporating space 102. The flexible cable 103 is fixed to the fixed member 100 and the movable member 101, and introduced out of the incorporating space 102. The winding direction of the flexible cable 103 is turned back through a U-shaped turned-back portion 103a within the incorporating space 102. A C-shaped spacer 104 is disposed within the aforementioned incorporating space so that the spacer is movable along the periphery of the aforementioned incorporating space. The turned-back portion 103a of the aforementioned flexible cable 103 is looped on a roller 105 which is supported through a shaft on the opening end of the spacer 104.

For example, if the movable member 101 is rotated clockwise in FIG. 10 while interlocked with a handle, the turned-back portion 103a of the flexible cable 103 moves along the periphery of the incorporating space 102 so that the flexible cable 103 is rewound on the outer cylindrical unit of the fixed member 100 more densely than on the inner cylindrical unit. In reverse to this case, if the movable member 101 is rotated counterclockwise in FIG. 10, the turned-back portion 103a of the flexible cable 103 moves in the same direction so that the flexible cable 103 is wound on the inner cylindrical unit of the movable member 101 more densely than on the outer cylindrical unit. When the flexible cable 103 is wound or rewound, the spacer 104 receives a force from the turned-back portion 103a of the flexible cable 103 and the spacer 104 moves in the same direction.

In the clock spring connector having the aforementioned construction, the flexible cable 103 is wound on the inner and outer cylindrical units so that the winding directions of the flexible cable are opposite to each other. Thus, the length of the flexible cable can be remarkably decreased thereby reducing the costs as compared with such a clock spring connector in which the flexible cable is wound on the inner and outer cylindrical members in the same direction (in an eddy state). The C-shaped spacer 104 is disposed in the incorporating space 102 defined between the flexible cable 103 wound on the inner cylindrical unit and the flexible cable 103 wound on the outer cylindrical unit, and the turned-back portion 103a of the flexible cable 103 is looped on the opening end of the spacer 104. Thus, the spacer 104 is capable of restraining the flexible cable 103 from swelling along the radius until the cable which is wound on the outer cylindrical unit or the inner cylindrical unit reaches the turned-back portion 103 when the flexible cable is wound or rewound. Consequently, it is possible to feed the flexible cable 103 smoothly toward the turned-back portion 103a.

The clock spring connector having the aforementioned construction is subjected to various inspections before the connector is finally mounted in the steering device of an automobile, and the inspections include, for example, continuity inspection for the flexible cable 103, torque inspection of the movable member 101 or the like. If the movable member 101 is rotated until all the portion of the flexible cable 103 is rewound on the outer cylindrical unit of the fixed member 100, and further the movable member is excessively rotated in the same direction. The flexible cable 103 is turned back and buckled near the flexible cable extending portion of the movable member 101, so that the reliability of the connection is reduced.

Accordingly, the applicant of the present invention proposed a clock spring connector which is intended to prevent the flexible cable from being buckled. In the proposed clock spring connector, a sheet-like tongue piece is fixed to the flexible cable near the inner cylindrical unit. If the movable member is excessively rotated in the rewinding direction, the aforementioned tongue piece engages in between the opening end of the spacer and the inner cylindrical unit, as a supporting stick in order to block the movable member from further rotating.

However, because, in the clock spring connector of the prior art, the flexible cable is wound on the surface of the inner cylindrical unit against an elastic force of the sheet-like tongue piece, when the clock spring connector is assembled, the flexible cable wound on the surface of the inner cylindrical unit swells greatly by the elastic force of the tongue piece in such a direction that the flexible cable wound on the inner cylindrical unit comes into contact with the flexible cable wound on the surface of the outer cylindrical unit. As a result, it becomes difficult to install a spacer between both the flexible cables. Besides, because the tip of the tongue piece comes into contact with the spacer during the operation of the clock spring connector, the spacer may be restrained from rotating smoothly, thereby causing noises.

SUMMARY OF THE INVENTION

Accordingly, it is a primary object of the present invention to provide a clock spring connector having a high reliability of the connection and excellent workability of the assembly, the clock spring connector being capable of reducing noises.

According to an object of the present invention, there is provided a clock spring connector comprising; a first housing having an outer cylindrical unit; a second housing which has an inner cylindrical unit and which is mounted to the first housing through a ring-like incorporating space so as to be rotatable relative to the first housing, a spacer which is disposed in the incorporating space; and a flexible cable which is wound on the inner cylindrical unit and the outer cylindrical unit so that the directions of the windings are opposite to each other and of which the turned-back portion passes through the spacer, the spacer moving in the incorporating space following the turned-back portion, the clock spring connector including an elastic tongue piece which is disposed along the portion extending from the inner cylindrical unit, of the flexible cable, the elastic tongue piece being formed to be curved so that the tongue piece is located between the inner cylindrical unit and the spacer when no load is applied thereto.

According to another object of the present invention, there is provided a clock spring connector comprising; a first housing having an outer cylindrical unit; a second housing which has an inner cylindrical unit and which is mounted to the first housing through a ring-like incorporating space so as to be rotatable relative to the first housing, a spacer which is disposed in the incorporating space; and a flexible cable which is wound on the inner cylindrical unit and the outer cylindrical unit so that the directions of the windings are opposite to each other and of which the turned-back portion passes through the spacer, the spacer moving in the incorporating space following the turned-back portion, the clock spring connector including an elastic tongue piece which is disposed along the portion extending from the inner cylindrical unit, of the flexible cable, the spacer containing a plurality of rollers which are disposed at a predetermined interval along the periphery thereof so that the rollers are rotatable through a shaft, the length of the elastic tongue piece along the periphery thereof being set to be longer than the maximum distance formed by continuous three rollers of these rollers.

According to still another object of the present invention, there is provided a clock spring connector comprising; a first housing having an outer cylindrical unit; a second housing which has an inner cylindrical unit and which is mounted to the first housing through a ring-like incorporating space so as to be rotatable relative to the first housing, a spacer which is disposed in the incorporating space; and a flexible cable which is wound on the inner cylindrical unit and the outer cylindrical unit so that the directions of the windings are opposite to each other and of which the turned-back portion passes through the spacer, the spacer moving in the incorporating space following the turned-back portion, the clock spring connector including an elastic tongue piece which is disposed along the portion extending from the inner cylindrical unit, of the flexible cable, the elastic tongue piece containing a locking portion which is locked with either the first housing or the second housing in order to locate the elastic tongue piece between the inner cylindrical unit and the spacer.

According to a further object of the present invention, there is provided a clock spring connector comprising; a first housing having an outer cylindrical unit; a second housing which has an inner cylindrical unit and which is mounted to the first housing through a ring-like incorporating space so as to be rotatable relative to the first housing, a spacer which is disposed in the incorporating space; and a flexible cable which is wound on the inner cylindrical unit and the outer cylindrical unit so that the directions of the windings are opposite to each other and of which the turned-back portion passes through the spacer, the spacer moving in the incorporating space following the turned-back portion, the clock spring connector including an elastic tongue piece which is disposed along the portion extending from the inner cylindrical unit, of the flexible cable, the elastic tongue piece being formed to be curved so that the tongue piece is in contact with the outer surface of the inner cylindrical unit when no load is applied thereto.

If the first or second housing is excessively rotated in the flexible cable's rewinding direction, for example, in the inspection process of the clock spring connector, the portion of the flexible cable which extends from the inner cylindrical unit is reinforced by means of the elastic tongue piece, thereby preventing the flexible cable from being buckled at the extending portion. Further, when the clock spring connector is actuated, the elastic tongue piece never interfere with the spacer, so that the spacer rotates smoothly within the incorporating space following the turned-back portion of the flexible cable and no collision sound between the elastic tongue piece and the spacer occurs.

DESCRIPTION OF THE PREFERRED EMBODIMENTS

Figure 1:
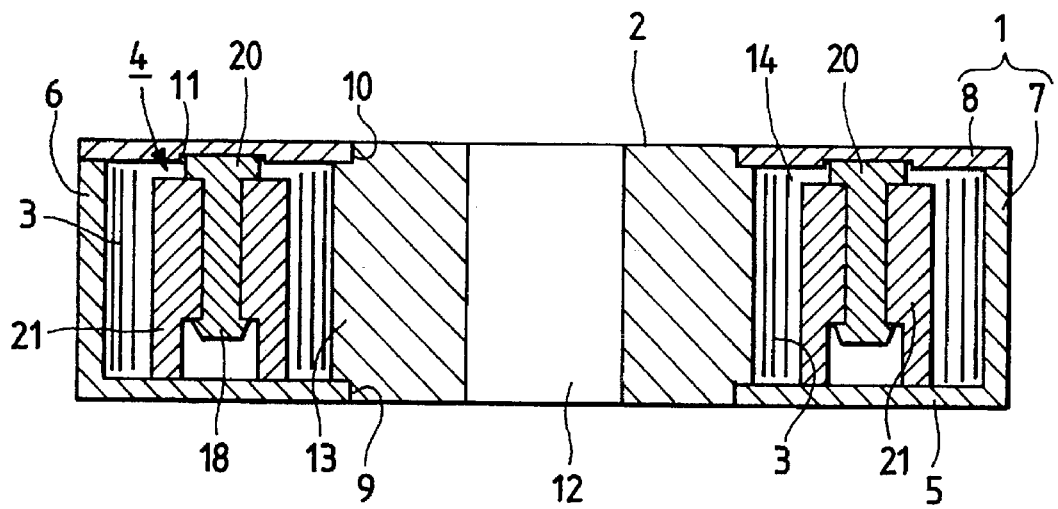
FIG. 1 is a vertical sectional view of a clock spring connector according to the first embodiment of the present invention.
Figure 3:
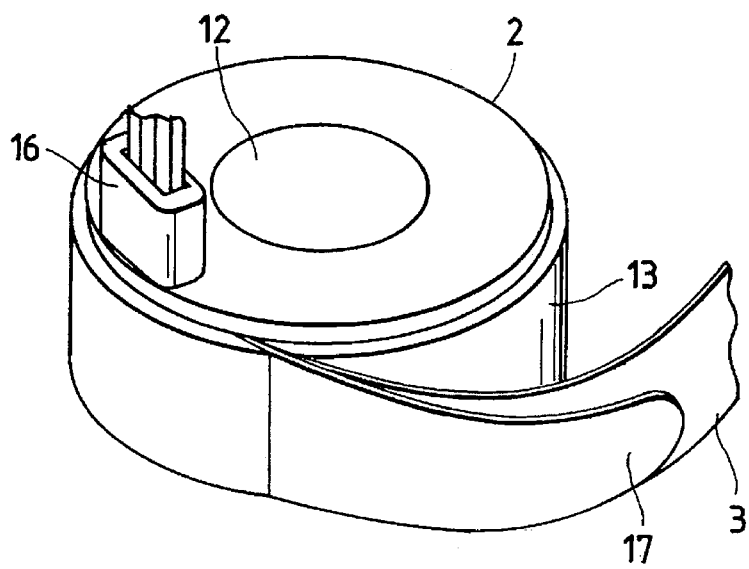
FIG. 3 is a perspective view of an elastic tongue piece which is provided on the clock spring connector.
Figure 2:
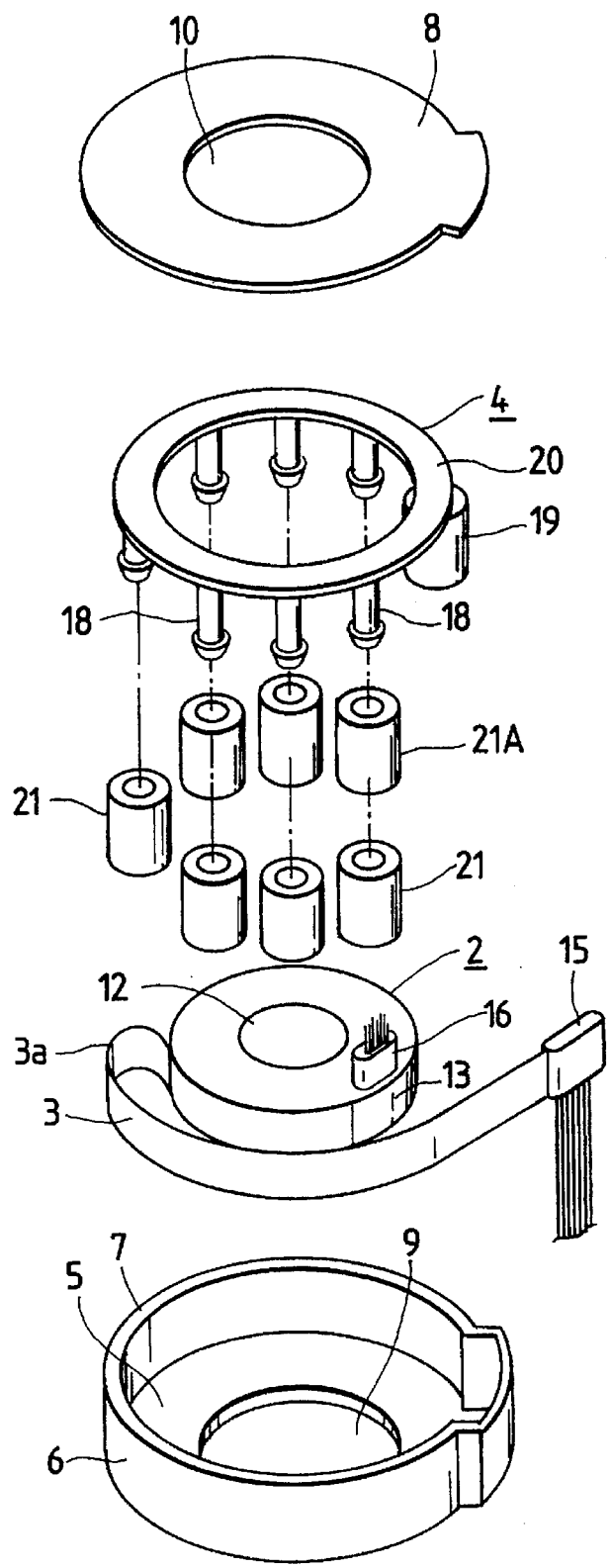
FIG. 2 is a disassembly perspective view of the clock spring connector shown in FIG. 1.
Figure 4:
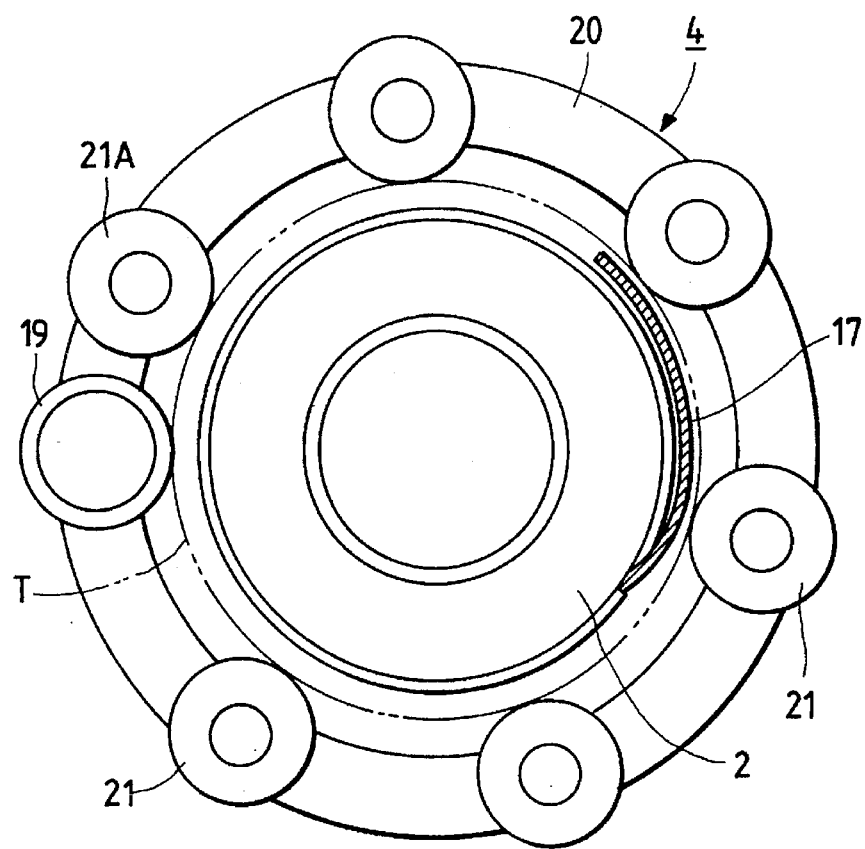
FIG. 4 is a bottom view showing the relationship between the elastic tongue piece shown in FIG. 3 and the spacer.
Figure 5:
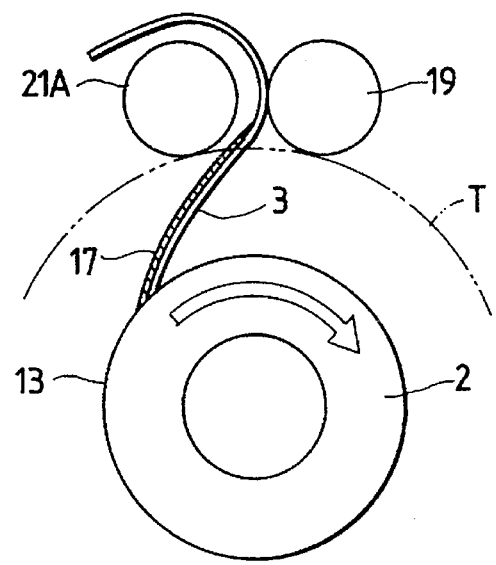
FIG. 5 is a drawing for explaining the operation of the elastic tongue piece.

Embodiments of the present invention will be described with reference to the accompanying drawings. FIG. 1 is a vertical sectional view of a clock spring connector according to the first embodiment of the present invention. FIG. 2 is a disassembly perspective view of the clock spring connector and FIG. 3 is a perspective view of the elastic tongue piece which is provided on the clock spring connector. FIG. 4 is a bottom view showing the relationship between the elastic tongue piece and the spacer. FIG. 5 is a drawing for explaining the operation of the elastic tongue piece. The clock spring connector according to the present invention substantially comprises a first housing 1, a second housing 2 which is mounted to the first housing so as to be rotatable relative to the first housing 1, a flexible cable 3 which is housed in both the housings 1 and 2, and a spacer 4 which is disposed between both the housings 1 and 2 so as to be rotatable along the periphery.

The first housing 1 comprises a lower case 7 in which an outer cylindrical unit 6 is placed on the outer edge of a bottom plate 5 and an upper cover 8 which is connected and integrated with the top end of the outer cylindrical unit 6. Center holes 9, 10 are made in the center of the bottom plate 5 and the upper cover 8 and a ring-like guide groove 11 is provided on the bottom face of the upper cover 8. On the other hand, the second housing 2 comprises a cylindrical unit having a shaft insertion hole 12 in the center. The top and bottom edges thereof are guided by the center holes 10, 9 of the upper cover 8 and the lower case 7, respectively, so that the second housing 2 is connected to the first housing so as to be rotatable relative to the first housing 1. An incorporating space 14 is defined by the bottom plate 5 of the first housing 1, the outer cylindrical unit 6, the upper cover 8, and the inner cylindrical unit 13 which forms the outer surface of the second housing 2.

The flexible cable 3 is composed of a so-called flat cable formed by laminating conductors parallel to each other with a pair of insulating films. One end of the flexible cable 3 is connected to a first connector 15 fixed to the aforementioned outer cylindrical unit 6 and the flexible cable 3 is introduced out of the first housing 1 through the first connector 15. On the other hand, the other end of the flexible cable 3 is connected to the second connector 16 fixed to the aforementioned inner cylindrical unit 13 and the flexible cable 3 is introduced out of the second housing 2 through the second connector 16. As shown in FIGS. 3 and 4, an elastic tongue piece 17 is fixed to a portion in which the flexible cable 3 is connected to the inner cylindrical unit 13, so that one end of the tongue piece is held, and the free end of the elastic tongue piece 17 extends along the outer surface of the flexible cable 3. The elastic tongue piece 17 is made of plastic material such as polypropylene, polyamide or the like. When no external force is applied thereto, the elastic tongue piece 17 is formed so that the tongue piece 17 is located between the outer surface of the aforementioned inner cylindrical unit and a locus (two-dot-chain line T in FIG. 4) drawn by the inner periphery of the spacer 4 described later. The flexible cable 3 starts from the first connector 15 and is wound clockwise on the inner surface of the outer cylindrical unit 6. Then, the flexible cable 3 is turned back in the shape of the letter U (hereinafter referred to as the turned-back portion 3a) and wound on the outer surface of the inner cylindrical unit counterclockwise together with the elastic tongue piece 17. The flexible cable 3 is incorporated in the aforementioned incorporating space 14 so that the cable 3 reaches the second connector 16.

The spacer 4 comprises a ring-like rotating plate 20 in which a plurality of pins 18 and a single fixed cylinder are placed on the bottom thereof and a group of rollers 21 which are supported by respective pins 18 so as to be rotatable. The components thereof are made of hard plastic material such as polypropylene or the like. This spacer 4 is disposed within the aforementioned incorporating space 14 so that the aforementioned rotating plate 20 is located up. The rotating plate 20 is engaged with the aforementioned guide groove 11 and guided so that the rotating plate 20 is rotatable along the periphery of the incorporating space 14. The turned-back portion 3a of the aforementioned flexible cable 3 is passed between the aforementioned fixed cylinder 19 and a roller 21 (hereinafter referred to as a turning-back roller indicated by the number 21A) and looped on the turning-back roller 21A.

When the clock spring connector having the aforementioned construction is assembled, the first and second connectors 15, 16 are connected to both ends of the flexible cable 3 which are cut by a predetermined length, and the second connector 16 is fixed to the second housing 2 together with the elastic tongue piece 17. Next, as shown in FIG. 2, the second housing 2 and the flexible cable 3 are incorporated in the lower case 7 with part of the flexible cable 3 being turned back in the shape of the letter U, and the first connector 15 is fixed to the inside of the outer cylindrical unit 6. On the other hand, the respective pins 18 of the rotating plate 20 support all the rollers 21 including the turning-back roller 21A so that the rollers are rotatable. The unit of the spacer 4 is incorporated in between the inner cylindrical unit 13 of the second housing 2 and the outer cylindrical unit 6 of the lower case 7 and the turned-back portion 3a of the flexible cable 3 is inserted in between the fixed cylinder 19 of the spacer 4 and the turning-back roller 21A. At this time, the flexible cable 3 wound on the inner cylindrical unit 13 swells slightly outward because the cable 3 receives an elastic force from the elastic tongue piece 17. However, because the elastic tongue piece 17 is curved not to be in contact with the spacer 4 as described before, the amount of the swelling is small. Thus, it is possible to insert the fixed cylinder 19 and the group of the rollers 21, of the spacer 4 in between the flexible cable wound on the inner cylindrical unit 13 and the flexible cable 3 wound on the outer cylindrical unit 6. After the spacer 4 is installed in between the second housing 2 and the lower case 7 properly, the upper cover 8 is placed on the outer cylindrical unit 6 of the lower case 7 finally, and the lower case and the upper cover are integrated by an appropriate fixing means such as fusion by heat or fixing with screws, thereby completing the assembly of the clock spring connector.

Next, by taking a case in which the aforementioned first housing 1 is a fixed member and the second housing 2 is a movable member, as an example, the operation of the clock spring connector according to the first embodiment described above will be described. In this case, the fist housing 1 is fixed to a steering column of a steering device and a lead wire introduced out of the lower case 7 is connected to an air bag driving circuit and a horn circuit or the like mounted on a vehicle body. The second housing 2 is connected to a rotor member such as a steering shaft, steering wheel or the like, and a lead wire introduced out of the second housing 2 is connected to an air bag inflator, a horn switch or the like mounted on a steering wheel.

When the steering wheel is rotated clockwise or counterclockwise, the rotating force is transmitted to the second housing 2 and consequently, the second housing 2 rotates clockwise or counterclockwise. For example, if the second housing 2 is rotated clockwise from the neutral position of the steering wheel, the turned-back portion 3a of the flexible cable 3 rotates clockwise by an amount smaller than in the second housing 2. The turned-back portion 3a leaves the turning-back roller 21A of the spacer 4 and presses the fixed cylinder 19. Thus, the spacer 4 rotates clockwise following the movement of the turned-back portion 3a and the flexible cable 3 which is about twice longer than the amount of the rotating distance is fed from the inner cylindrical unit 13, and then rewound on the outer cylindrical unit 6. In this case, the flexible cable 3 which is fed from the inner cylindrical unit 13 is restrained from swelling outward along the radius by means of the fixed cylinder 19 and the group of the respective rollers 21. Thus, the flexible cable 3 is fed smoothly to the turned-back portion 3a and then is rewound securely on the outer cylindrical unit 6 through the turned-back portion 3a. If the amount of the flexible cable 3 which is rewound on the outer cylindrical unit 6 increases, a tightening force applied to the elastic tongue piece 17 by the flexible cable 3 is eliminated so that the elastic tongue is charged with no load. However, because the elastic tongue piece 17 is curved not to be in contact with the spacer 4 even under this no-load condition, as described before, the movement of the spacer 4 is not obstructed by the elastic tongue piece 17, so that no collision sound between the spacer 4 and the elastic tongue piece 17 occurs.

In reverse to the case described above, if the second housing 2 is rotated counterclockwise from the neutral position of the steering wheel, the turned-back portion 3a of the flexible cable 3 rotates counterclockwise by the amount of rotation smaller than in the second housing 2, and the turning-back roller 21A is pulled by the turned-back portion 3a. Thus, the spacer 4 rotates clockwise following the turned-back portion 3a, and the flexible cable 3 which is about twice longer than the amount of the rotation is fed from the outer cylindrical unit 6 and wound on the inner cylindrical unit 13. In this case, because the flexible cable 3 which is fed from the outer cylindrical unit 6 is restrained from swelling inward along the radius by means of the fixed cylinder 19 and the respective rollers 21, the flexible cable 3 is fed smoothly to the turned-back portion 3a, so that the flexible cable 3 is wound securely on the inner cylindrical unit 13 through the turned-back portion 3a.

According to the first embodiment of the present invention, an elastic tongue piece 17 which extends along the flexible cable 3 is fixed to the inner cylindrical unit 13 of the second housing 2 and the elastic tongue piece 17 is curved so that the tongue piece is located between the spacer 4 and the inner cylindrical unit 13 when no load is applied to the tongue piece. Thus, in the assembly process of the clock spring connector, the flexible cable 3 wound on the inner cylindrical unit 13 does not swell largely by the elastic tongue piece 17, so that it is possible to insert the spacer 4 in between the flexible cable 3 wound on the inner cylindrical unit 13 and the flexible cable 3 wound on the outer cylindrical unit 6 easily, thereby improving the workability of the assembly.

If as shown in FIG. 5, the second housing 2 is excessively rotated in the rewinding direction for example, in the inspection process before the clock spring connector is incorporated in the steering device of an automobile, the elastic tongue piece 17 functions as a member for preventing the flexible cable 3 from being bent at the portion in which the flexible cable 3 is connected to the inner cylindrical unit 13. Thus, an inspector can know that the second housing 2 has been rotated excessively in the rewinding direction by an increase of torque, in order to prevent the flexible cable 3 from being buckled.

If the amount of the flexible cable 3 which is rewound on the outer cylindrical unit 6 increases when the clock spring connector is operated, a tightening force applied to the elastic tongue piece 17 by the flexible cable 3 is eliminated so that the elastic tongue piece is charged with no load. Because the elastic tongue piece 17 is formed to have a predetermined curvature so that the tongue piece 17 is not in contact with the spacer 4 even under this no-load condition, the movement of the spacer 4 is not obstructed by the elastic tongue piece 17, so that no collision sound between the spacer 4 and the elastic tongue piece 17 occurs.

FIGS. 6-9 are drawings for explaining other embodiments of the present invention and the same reference numerals are attached to the parts which correspond to FIG. 1-5.

Figure 6:
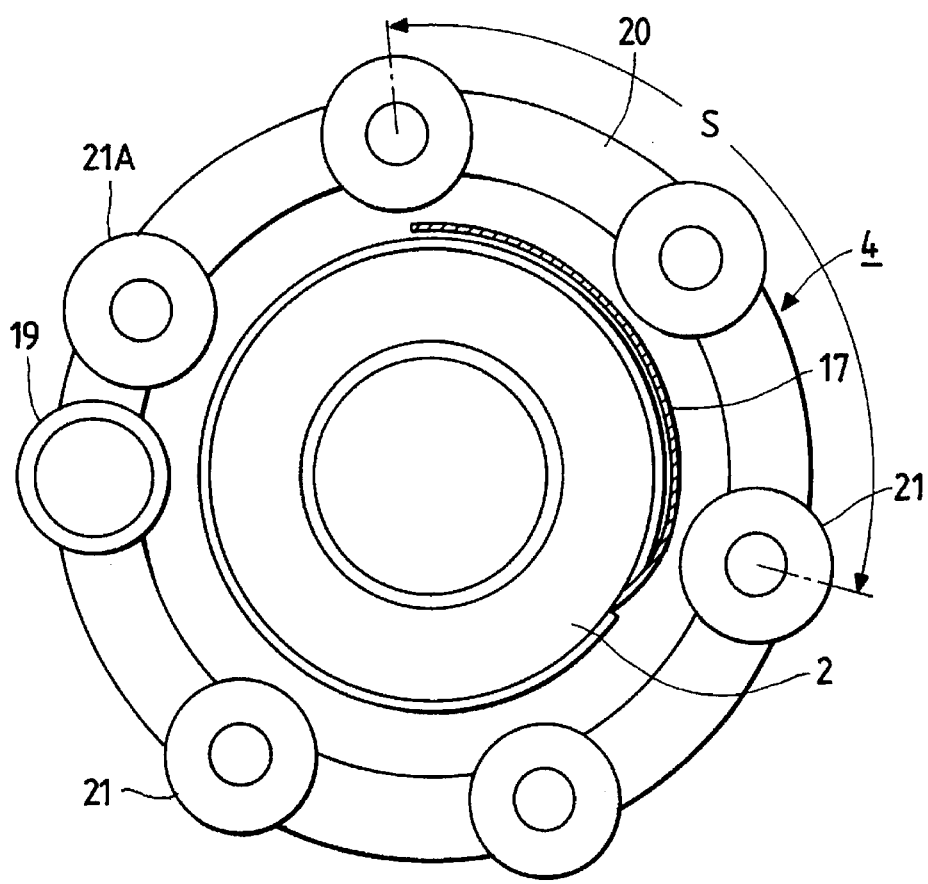
FIG. 6 is a bottom view showing the major parts of the clock spring according to the second embodiment of the present invention.

First, referring to the second embodiment shown in FIG. 6, the elastic tongue piece 17 employed in the present embodiment is curved moderately so as to be in contact with the spacer 4 when no load is applied or a flat sheet which is not curved. The length of the elastic tongue piece 17 along the periphery is set to be longer khan the distance S formed by continuous three rollers 21 (including the fixed cylinder 19 and the turning-back roller 21A). Because the distance between the respective rollers 21 is not equal according to the present embodiment, the length of the elastic tongue piece 17 along the periphery is set to be longer than the maximum distance S which is formed by the three continuous rollers 21.

In the aforementioned second embodiment, the elastic tongue piece 17 and the group of rollers 21 provided on the spacer 4 move relatively to each other during the operation of the clock spring connector. Because the elastic tongue piece 17 comes into contact with the spacer 4 because the amount of the flexible cable 3 to be rewound on the outer cylindrical unit 6 increases, the outer surface of the elastic tongue piece 17 always contacts two or more rollers 21 and therefore the free end of the elastic tongue piece 17 does not enter in between the respective rollers. Thus, the movement of the spacer 4 is not obstructed by the elastic tongue piece 17 and further it is possible to prevent the occurrence of collision sound between the free end of the elastic tongue piece 17 and the roller 21.

Figure 7:
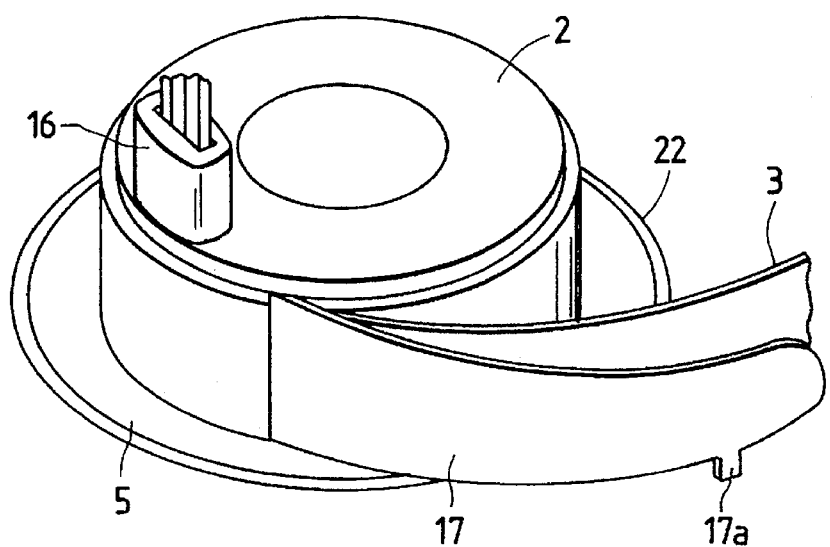
FIG. 7 is a perspective view showing the major parts of the clock spring connector according to the third embodiment of the present invention.

Explaining the third embodiment shown in FIG. 7, the points in which the present embodiment is different from the first embodiment are that a ring-like guide groove 22 is provided near the center hole 9 of the bottom plate 5 and a protrusion 17a provided on the elastic tongue piece 17 is engaged with the guide groove 22 in order to curve the elastic tongue piece 17 in a space defined between the inner cylindrical unit 13 and the spacer 4, and the other configuration is basically the same as in the first embodiment.

Figure 8:
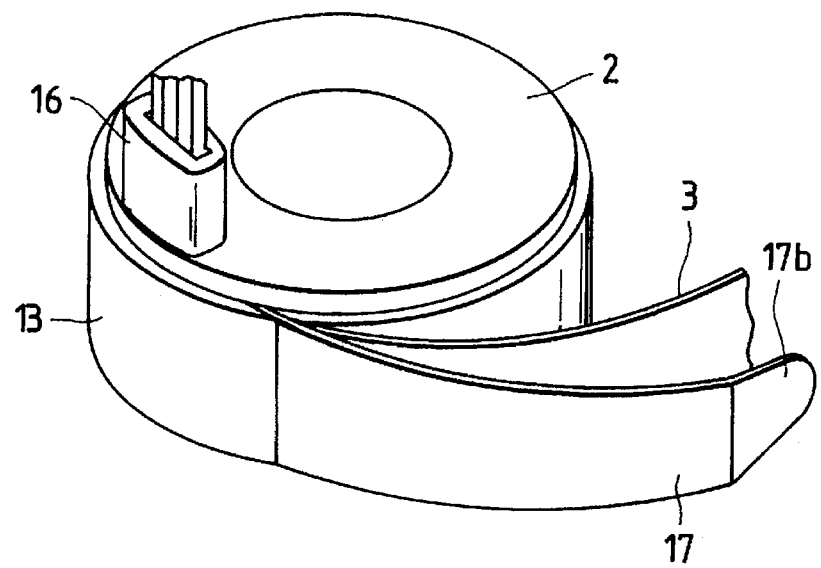
FIG. 8 is a perspective view showing a modified example of the elastic tongue piece.

If a bent portion 17b in which the free end (tip) of the elastic tongue piece 17 is bent inward is formed as shown in FIG. 8 in the first–third embodiments described above, it is possible to prevent an interference between the elastic tongue piece 17 and the spacer 4 further securely.

Figure 9:
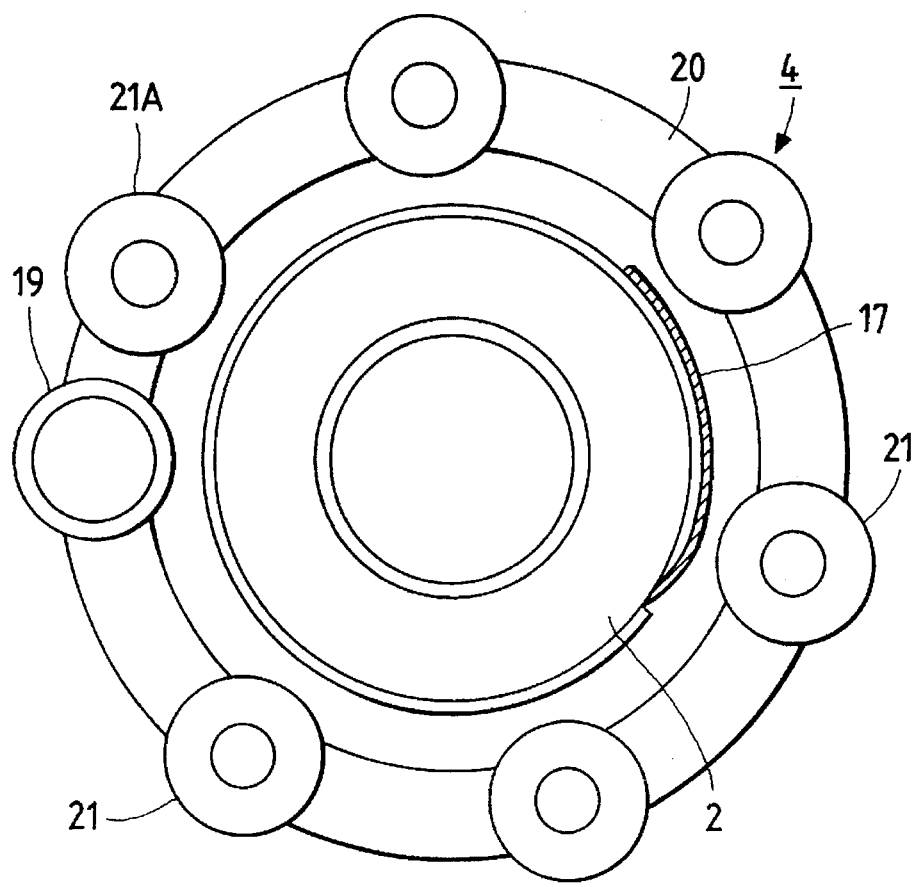
FIG. 9 is a bottom view showing the major parts of the clock spring connector according to the fourth embodiment of the present invention.
Figure 10:
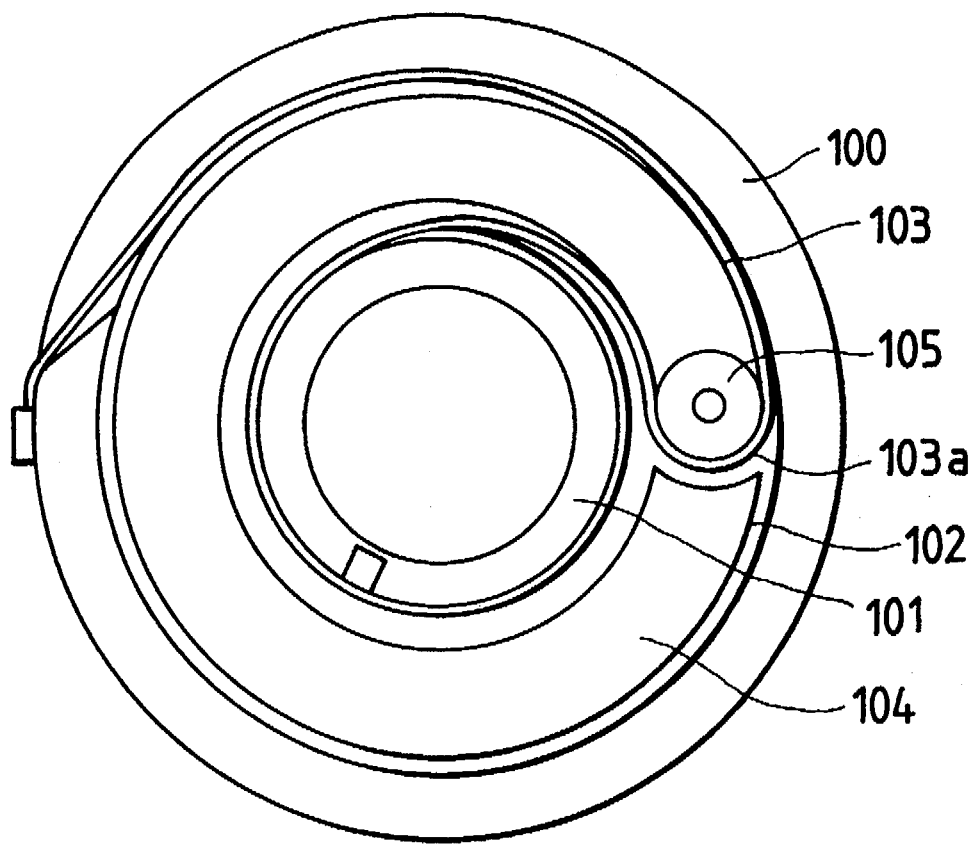
FIG. 10 is a plan view of a clock spring connector of the prior art.

Finally, explaining the fourth embodiment shown in FIG. 9, the elastic tongue piece 17 employed in the present embodiment is formed to be curved so that the elastic tongue piece 17 is in contact with the outer surface of the inner cylindrical unit 13 when no load is applied to the tongue piece 17, and the other configuration is basically the same as in the first embodiment. In this case, the end portion in which the flexible cable 3 is connected to the inner cylindrical unit 13 is energized by the elastic tongue piece 17 in such a direction that the flexible cable 3 is in contact with the outer surface of the inner cylindrical unit 13, thereby providing the same effect as in the first embodiment.

In the aforementioned respective embodiments, one end of the elastic tongue piece 17 is fixed to the inner cylindrical unit 13 and the free end of the elastic tongue piece 17 extends along the outer periphery of the flexible cable 3. In reverse to this case, it is possible to make the free end of the elastic tongue piece 17 extend along the inner periphery of the flexible cable 3. This requirement can be satisfied if the elastic tongue piece 17 is integrated with the flexible cable 3 by an appropriate means.

In the aforementioned respective embodiments, the first housing 1 is a fixed member and the second housing 2 is a movable member. In reverse to this case, it is possible to employ the first housing 1 and the second housing 2 as a movable member and a fixed member, respectively.

As described above, according to the present invention, it is possible to prevent the flexible cable from being excessively rewound by means of the elastic tongue piece. Further, because an interference between the elastic tongue piece and the spacer can be prevented during the operation of the clock spring connector or during the assembly process of it is possible to provide a clock spring connector having a high reliability of the connection and excellent workability in the assembly process, the clock spring connector being capable of reducing noises.

What is claimed is:

1. A clock spring connector comprising:

a first housing having an outer cylindrical unit;

a second housing which has an inner cylindrical unit and which is mounted to said first housing such that the second housing is rotatable relative to said first housing, the first and second housings defining a ring-like incorporating space;

a spacer movably disposed in said incorporating space; and a flexible cable wound in opposing directions on said inner cylindrical unit and said outer cylindrical unit and including a turned-back portion passing through said spacer, said spacer moving in said incorporating space following said turned-back portion, wherein said clock spring connector includes an elastic tongue piece extending from said inner cylindrical unit, and said spacer contain a plurality of rollers which are disposed at a predetermined interval along the periphery thereof so that said rollers are rotatable around a shaft, a length of said elastic tongue piece being longer than a distance separating three of said plurality of rollers.

2. A clock spring connector according to claim 1, wherein one end of said elastic tongue piece is fixed to said inner cylindrical unit, and wherein a bent portion is formed on a free end of said elastic tongue piece, said bent portion being bent toward the inner cylindrical unit.

* * * * *